United States Patent
Badr et al.

(10) Patent No.: US 12,087,055 B2
(45) Date of Patent: Sep. 10, 2024

(54) REAL TIME OBJECT DETECTION AND TRACKING

(71) Applicant: Google LLC, Mountain View, CA (US)

(72) Inventors: Ibrahim Badr, New York, NY (US); Roland Peter Kehl, Dubendorf (CH); Kaan Yucer, San Francisco, CA (US); Thomas Jonathan Stone, Zürich (CH); Gokhan H. Bakir, Zürich (CH); Adrian Zumbrunnen, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/188,005

(22) Filed: Mar. 22, 2023

(65) Prior Publication Data
US 2023/0222792 A1 Jul. 13, 2023

Related U.S. Application Data

(63) Continuation of application No. 16/347,484, filed as application No. PCT/IB2018/053167 on May 7, 2018, now Pat. No. 11,651,589.

(51) Int. Cl.
*G06V 20/20* (2022.01)
*G06F 18/24* (2023.01)
(Continued)

(52) U.S. Cl.
CPC .............. *G06V 20/20* (2022.01); *G06F 18/24* (2023.01); *G06T 7/248* (2017.01); *G06T 7/74* (2017.01);
(Continued)

(58) Field of Classification Search
CPC ...... G03B 2205/0007; G03B 2217/005; G03B 7/00; G06T 19/006
See application file for complete search history.

(56) References Cited

U.S. PATENT DOCUMENTS 9,195,898 B2   11/2015   Huang et al.
9,571,722 B2   2/2017    Deng et al.
(Continued)

FOREIGN PATENT DOCUMENTS

JP    8241414      9/1996
JP    H 11088811   3/1999
(Continued)

OTHER PUBLICATIONS

Chen et al., "Memory Efficient Image Databases for Mobile Visual Search.", Institute of Electrical and Electronics Engineers, Mar. 2014, 182 pages.
(Continued)

*Primary Examiner* — Clifford Hilaire
(74) *Attorney, Agent, or Firm* — DORITY & MANNING P.A.

(57) ABSTRACT

Methods, systems, and apparatus for recognizing objects and providing content related to the recognized objects are described. In one aspect, a method includes detecting presence of one or more objects depicted in a viewfinder of a camera of the mobile device. In response to detecting the presence of the one or more objects, image data representing the one or more objects is sent to a content distribution system that selects content related to objects depicted in images. A location of each of the one or more objects in the viewfinder of the camera is tracked while waiting to receive content from the content distribution system. Content related to the one or more objects is received from the content distribution system. A current location of each object in the viewfinder is determined and the content related to the object is presented within the viewfinder at the current location of the object.

20 Claims, 4 Drawing Sheets

(51) Int. Cl.
- *G06T 7/246* (2017.01)
- *G06T 7/73* (2017.01)
- *G06V 10/764* (2022.01)
- *G06V 20/50* (2022.01)
- *H04N 23/61* (2023.01)
- *H04N 23/63* (2023.01)

(52) U.S. Cl.
CPC ............ *G06V 10/764* (2022.01); *G06V 20/50* (2022.01); *H04N 23/61* (2023.01); *H04N 23/63* (2023.01); *H04N 23/633* (2023.01); *G06T 2207/10016* (2013.01); *G06T 2207/30244* (2013.01)

(56) References Cited

U.S. PATENT DOCUMENTS

| | | |
|---|---|---|
| 11,967,299 B2 | 4/2024 | Ko et al. |
| 2014/0208372 A1 | 7/2014 | White et al. |
| 2014/0365472 A1 | 12/2014 | Schloter |
| 2015/0139484 A1 | 5/2015 | Wu et al. |
| 2015/0187108 A1 | 7/2015 | Mullins |

FOREIGN PATENT DOCUMENTS

| | | |
|---|---|---|
| JP | 2006/293912 | 10/2006 |
| JP | 2013/541096 | 11/2013 |
| JP | 2017/085564 | 5/2017 |
| JP | 6318289 | 4/2018 |

OTHER PUBLICATIONS

Youtube, Chen et al, "Memory-Efficient Image Databases for Mobile Visual Search.", Dec. 2013, https://www.youtube.com/watch? v=L1 HaaVTB6S8>, retrieved on May 1, 2019, 1 page.

International Preliminary Report on Patentability for Application No. PCT/IB2018/053167, mailed Nov. 19, 2020, 7 pages.

International Search Report and Written Opinion for PCT/IB2018/053167, mailed Jan. 17, 2019, 13 pages.

Chinese Search Report Corresponding to Application No. 2018800932873 on Jun. 11, 2024.

REAL TIME OBJECT DETECTION AND TRACKING

The present application is a continuation of U.S. application Ser. No. 16/347,484 having a filing date of May 3, 2019, which is based upon and claims the right of priority under 35 U.S.C. § 371 to International Application No. PCT/IB2018/053167 filed on May 7, 2018. Applicant claims priority to and the benefit of each of such applications and incorporates all such applications herein by reference in its entirety.

BACKGROUND

Computer visual analysis techniques can be used to detect and recognize objects in images. For example, optical character recognition (OCR) techniques can be used to recognize text in images and edge detection techniques can be used to detect objects (e.g., products, landmarks, animals, etc.) in images. Content related to the detected objects can be provided to a user, e.g., a user that captured the image in which the object is detected.

SUMMARY

This specification describes technologies relating to presenting content related to objects recognized in images.

In general, one innovative aspect of the subject matter described in this specification can be embodied in a method performed by one or more data processing apparatus of a mobile device, the method comprising: detecting presence of one or more objects depicted in a viewfinder of a camera of the mobile device; in response to detecting the presence of the one or more objects: sending image data representing the one or more objects to a content distribution system that selects content related to objects depicted in images; and tracking a location of each of the one or more objects in the viewfinder of the camera while waiting to receive content from the content distribution system; receiving, from the content distribution system, content related to the one or more objects; and for each of the one or more objects: determining, based on the tracking, a current location of the object in the viewfinder; and presenting, within the viewfinder and at the current location of the object, the received content related to the object.

Other implementations of this aspect include corresponding apparatus, methods, systems, and computer programs, configured to perform the actions of the methods, encoded on computer storage devices.

These and other implementations can each optionally include one or more of the following features. Detecting the presence of the object in the image may comprise: capturing a sequence of images using the camera of the mobile device; determining, based on pixel data for the images in the sequence of images, that the camera is substantially still; in response to determining that the camera is substantially still, capturing a given image after the camera has stopped moving; and analyzing the given image using object detection techniques to detect the presence of the object in the given image. Determining, based on pixel data for the images in the sequence of images, that the camera is substantially still may comprise: identifying a respective location for each pixel in a first image in the sequence of images; for each pixel in the first image: identifying a respective location, in one or more subsequent images captured after the first image was captured, of a corresponding pixel that matches the pixel; and determining a distance between the respective location of the pixel in the first image and the respective location of the corresponding pixel in each subsequent image; determining that the camera is substantially still based on each determined distance being less than a threshold distance. Presenting, in the viewfinder for the camera, the content for the object at the current location of the object may comprise presenting the content over or adjacent to the object in the viewfinder. Determining a current location of the object in the viewfinder for the camera may comprise: identifying, in the given image, a first set of pixels that correspond to the object; and determining a location of a second set of pixels in the viewfinder that match the first set of pixels. Determining a current location of the object in the viewfinder of the camera may comprise: receiving a first image representing one or more objects depicted in the viewfinder of a camera of the mobile device; determining a first visual characteristic of a first set of pixels represented in the first image and associated with the object; receiving a second image representing one or more objects depicted in the viewfinder of the camera of the mobile device; and determining a location of the object in the second image based upon the first visual characteristic. Determining a current location of the object in the viewfinder of the camera may comprise: determining a second visual characteristic of a second set of pixels represented in the first image; determining a distance between the first set of pixels and the second set of pixels; and determining a location of the object in the second image based upon the first and second visual characteristics and the determined distance. Determining that the camera is substantially still may be based upon the location of the object in the first image and the location of the object in the second image. Determining that the camera is substantially still may be further based upon a time associated with the first image and a time associated with the second image. The content distribution system may analyze the image data to recognize each of the one or more objects; select content for each of the one or more objects; and pre- cache the content prior to receiving the request for content related to the given object. Presenting, within the viewfinder and for each of the one or more objects, a visual indicator that indicates that content related to the object is being identified. Detecting presence of one or more objects depicted in a viewfinder of a camera of the mobile device may comprise: processing image data representing the one or more objects depicted in a viewfinder of a camera of the mobile device using a coarse classifier. The coarse classifier may comprise a light-weight model. Classifying each of the one or more objects into a respective object class; and selecting, from multiple visual indicators, a respective visual indicator for each of the one or more objects based on the respective class for the object. Sending image data representing the one or more objects to a content distribution system may further comprise sending data specifying a location associated with the one or more objects.

The subject matter described in this specification can be implemented in particular embodiments so as to realize one or more of the following advantages. Images captured from a viewfinder of a camera of a mobile device can be provided (e.g., streamed) to a content distribution system that provides content related to objects recognized in the images so that the content is presented more quickly, e.g., in response to a user request to view the content. For example, rather than waiting for a user to select an object (or an interface control for the object) in an image and transmit the image to the content distribution system in response to the selection, images can be transmitted to the content distribution system automatically to increase the speed at which the content is presented. The content for the recognized objects can be stored in high speed memory (e.g., in a cache or at the top of a memory stack) at a server of the content distribution system or at the user's device to further increase the speed at which the content is presented in response to a user request On-device pixel tracking and/or on-device object detection techniques can be used to ensure that the images transmitted to the content distribution system are of sufficient quality to recognize objects and/or that the images include an object for which the user would be interested in viewing content. For example, by tracking the movement of visual content represented by individual or groups of pixels within a viewfinder, the mobile device can determine when the device is still or substantially still (e.g., moving less than a threshold amount) and provide images to the content distribution system when the device is determined to be still or substantially still. Images captured when the device is substantially still can result in the processing of images that are of a higher quality than when the device is moving, which results in more accurate object recognition by the content distribution system. This also avoids processing low quality images using computationally expensive image processing techniques. The fact that the device is still may also be indicative of the user's interest in one or more objects in the field of view of the viewfinder which may reduce the likelihood that images are transmitted and processed unnecessarily.

By only transmitting images captured when the user's device is determined to be still or substantially still, the number of images sent over a network to the content distribution system and processed by the content distribution can be significantly reduced, resulting in less consumed bandwidth, faster network communications, reduced demand on the content distribution system, and faster object recognition and content selection by the content distribution system. Using object detection techniques at the user's device to determine whether an image depicts an object and only providing images that depict an object to the content distribution system can provide similar technical improvements over streaming all captured images to the content distribution system.

By presenting a visual indicator that indicates that content for an object is being identified, the user experience is improved as the user receives real time feedback to the user. This makes it clear to users what the application is capable of detecting and for which the application is capable of providing content, which helps users learn to use the application.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, systems and techniques described herein can recognize objects depicted in a viewfinder of a camera of a mobile device and present information and/or content related to the recognized objects, e.g., within the viewfinder. An application can present the viewfinder and detect the presence of one or more objects depicted in the viewfinder. In response, the application can present visual indicators for each detected object and send image data that represents the field of view of the viewfinder to a content distribution system that provides content based on objects depicted in images. The application can track the location of the objects in the viewfinder such that, when content related to the object is received, the application can present the content at (e.g., over, adjacent to, or within a threshold distance of) the object.

The application can present the information and/or content for an object in response to user interaction with the visual indicator (or other user interface control) for the object or automatically, e.g., in response to receiving the content or determining that the object is the object for which the user is interested in viewing content. For example, the application can select an object for which to present content based on the location of the object in the viewfinder (e.g., the object closest to the center of the viewfinder) or based on detected actions of the user (e.g., zooming in on the object or moving the camera such that other objects are no longer in the field of view of the camera).

The application can selectively provide image data to the content distribution system. For example, the application may capture image data and send the image data to the content distribution system in response to determining that the mobile device is substantially still (e.g. not moving more than a threshold amount). The lack of movement can be used as a proxy for image quality and the user's interest in one or more objects in the field of view of the viewfinder. For example, if the user moves the mobile device such that the camera is pointing at an object and stops moving the mobile device, it is likely that the user is interested in obtaining content (e.g., information or a user experience) related to the object As described in more detail below, the application can determine whether the mobile device is substantially still by tracking the movement of visual content represented by individual pixels or groups of pixels. By selectively sending image data to a content distribution system from a device, the application can reduce the amount of image data transmitted to a server and can address problems associated with bandwidth usage whilst avoiding requiring a user to provide input to select images to be transmitted.

Figure 1:
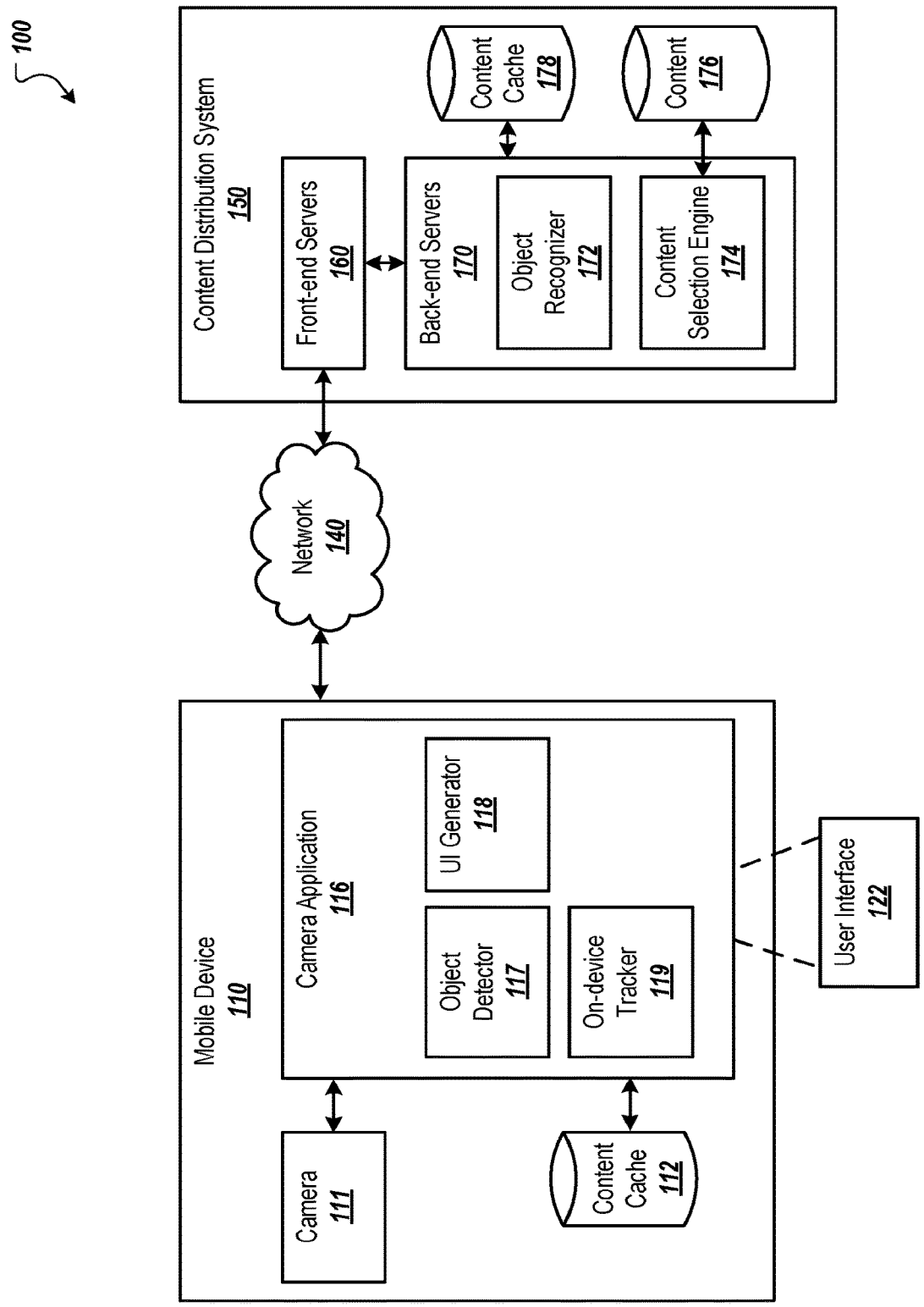
FIG. 1 is a block diagram of an environment in which a camera application of a mobile device presents content related to objects recognized in a viewfinder of a camera of the mobile device.

FIG. 1 is a block diagram of an environment 100 in which a camera application 116 of a mobile device 110 presents content related to objects recognized in a viewfinder of a camera 111 of the mobile device 110. The mobile device 110 is an electronic device that is capable of requesting and receiving resources over a data communication network 140, such as a local area network (LAN), a wide area network (WAN), the Internet, a mobile network, or a combination thereof. Example mobile devices 110 include smartphones, tablet computers, and wearable devices (e.g., smart watches). The environment 100 can include many mobile devices 110.

The camera application 116 can be a native application developed for a particular platform. The camera application 116 can control the camera 111 of the mobile device 110. For example, the camera application 116 may be a dedicated application for controlling the camera, a camera-first application that controls the camera 111 for use with other features of the application, or another type of application that can access and control the camera 111. The camera application 116 can present the viewfinder of the camera 111 in user interfaces 122 of the camera application 116.

In general, the camera application 116 enables a user to view content (e.g., information or user experiences) related to objects depicted in the viewfinder of the camera 111 and/or view content related to objects depicted in images stored on the mobile device 110 or stored at another location accessible by the mobile device 110. The viewfinder is a portion of the mobile device's display that presents a live image of what is in the field of the view of the camera's lens. As the user moves the camera 111 (e.g., by moving the mobile device), the viewfinder is updated to present the current field of view of the lens.

The camera application 116 includes an object detector 117, a user interface generator 118, and an on-device tracker 119. The object detector 117 can detect objects in the viewfinder using edge detection and/or other object detection techniques. In some implementations, the object detector 117 includes a coarse classifier that determines whether an image includes an object in one or more particular classes (e.g., categories) of objects. For example, the coarse classifier may detect that an image includes an object of a particular class, with or without recognizing the actual object.

The coarse classifier can detect the presence of a class of objects based on whether or not the image includes (e.g., depicts) one or more features that are indicative of the class of objects. The coarse classifier can include a light-weight model to perform a low computational analysis to detect the presence of objects within its class(es) of objects. For example, the coarse classifier can detect, for each class of objects, a limited set of visual features depicted in the image to determine whether the image incudes an object that falls within the class of objects. In a particular example, the coarse classifier can detect whether an image depicts an object that is classified in one or more of the following classes: text, barcode, landmark, media object (e.g., album cover, movie poster, etc.), or artwork object (e.g., painting, sculpture, etc.). For barcodes, the coarse classifier can determine whether the image includes parallel lines with different widths.

In some implementations, the coarse classifier uses a trained machine learning model (e.g., a convolutional neural network) to determine whether images includes objects in one or more classes based on visual features of the images. For example, the machine learning model can be trained using labeled images that are labeled with their respective class(es) of objects. The machine learning model can be trained to classify images into zero or more of a particular set of classes of objects. The machine learning model can receive, as inputs, data related to the visual features of an image and output a classification into zero or more of the classes of objects in the particular set of classes of objects.

The coarse classifier can output data specifying whether a class of object has been detected in the image. The coarse classifier can also output a confidence value that indicates the confidence that the presence of a class of object has been detected in the image and/or a confidence value that indicates the confidence that an actual object, e.g., the Eiffel Tower, is depicted in the image.

The object detector 117 can receive image data representing the field of view of the camera 111 (e.g., what is being presented in the viewfinder) and detect the presence of one or more objects in the image data. If at least one object is detected in the image data, the camera application 116 can provide (e.g., transmit) the image data to a content distribution system 150 over the network 140. As described below, the content distribution system 150 can recognize objects in the image data and provide content related to the objects to the mobile device 110.

In some implementations, the camera application 116 uses the object detector 117 to detect the presence of objects in the viewfinder when the camera 111 is determined to be substantially still or to have stopped moving. The camera 111 can be considered substantially still when the camera 111 is determined to be moving less than a threshold amount (e.g., less than 10 millimeters per second). The camera 111 can be considered to have stopped moving when the amount of movement has dropped below the threshold amount after moving more than the threshold amount. By only processing image data for images captured when the camera 111 is determined to be substantially still, the camera application 116 can ensure that higher quality images are being processed rather than wasting expensive computational resources on low quality images for which object detection may not be possible or accurate.

In addition, it is more likely that a user is interested in receiving content for objects in the field of view of the camera 111 when the camera 111 is substantially still than when the camera 111 is moving more than a threshold amount. For example, if a user wants to obtain content related to an object, the user is likely to hold the mobile device 110 such that the object is steady in the field of view of the camera 111. Thus, by only processing data for images captured when the camera 111 is determined to be still, expensive computational resources are not wasted to detect and/or recognize objects in images for which the user has no interest in received content.

The camera application 116 can use the on-device tracker 119 (which can be part of the camera application 116 or a stand-alone tracker) to determine when the camera 111 is substantially still. The on-device tracker 119 can track the movement of visual content represented by individual or groups of pixels within a viewfinder. For example, the on-device tracker 119 can track the movement of the pixel(s) throughout a sequence of images captured by the camera 111 using pixel data for the images. To track the movement, the on-device tracker 119 can determine visual characteristics (e.g., color, intensity, etc.) of each pixel (or at least a portion of the pixels) of an image. The on-device tracker 119 can then identify the location of the visual content represented by that pixel in subsequent images, e.g., by identifying a pixel having the same or similar visual characteristics in the subsequent images.

As multiple pixels in an image may have the same visual characteristics, the on-device tracker 119 can track the movement of the visual content represented by the pixels based on multiple pixels in the images and the relative location of the pixels. For example, if a first group of pixels having the same or similar first visual characteristics is a particular distance from a second group of pixels having the same or similar second visual characteristics in a first image, and the two groups of pixels are identified in a second image the same distance apart, the on-device tracker 119 can determine that the second group of pixels match the first group of pixels. The on-device tracker 119 can then determine a distance that the visual content represented by the groups of pixels moved in the viewfinder and use that distance to estimate the amount of movement of the camera 111.

The on-device tracker 119 can estimate the movement of the camera 111 based on the distance (e.g., in terms of number of pixels) each pixel has moved between successive images and a duration of time between when each image is captured. In this example, the movement can be based on a number of pixels per second. The on-device tracker 119 can convert this measurement to centimeters per second by multiplying the number of pixels per second by a constant value.

In some implementations, the mobile device 110 includes a gyroscope and/or accelerometer that can detect movements of the mobile device 110. The camera application 116 can receive data describing the movement of the mobile device 110 from the gyroscope and/or accelerometer and use the data to determine whether the mobile device 110 is substantially still (e.g., moving less than a threshold amount).

The on-device tracker 119 can also track the movement of objects detected by the object detector 117 across multiple images. For example, the object detector 117 can output data specifying the location (e.g., pixel coordinates) of an object detected in an image. The pixel coordinates can include coordinates for multiple locations along the perimeter of the object, e.g., to outline the object The on-device tracker 119 can then monitor the movement of the object based on the movement of the visual content depicted by the pixels at that location (e.g., within the pixel coordinates) across subsequent images. As described below, the location of the object in subsequent images can be used to determine where to present content for the object in the viewfinder.

To track the movement of the object, the on-device tracker 119 can analyze each subsequent image to identify the location of the visual content presented in the pixel coordinates of the first image in which the object was detected, similar to the way the on-device tracker 119 tracks the movement of individual pixels and groups of pixels. For example, the on-device tracker 119 can determine the visual characteristics of each pixel within the pixel coordinates for the object in the first image and the relative orientation of the pixels (e.g., distance and direction between pairs of pixels). In each subsequent image, the on-device tracker 119 can attempt to identify pixels having the same (or similar) visual characteristics and the same (or similar) orientation. For example, the orientation of an object within the viewfinder may change based on a change in orientation of the mobile device 110, a change in orientation of the object, and/or a change in distance between the mobile device 110 and the object. Thus, the on-device tracker 119 may determine that a group of pixels in a subsequent image matches the object if the distance between each pair of pixels is within a threshold of the distance between the pair of pixels in previous images.

In another example, the on-device tracker 119 can determine that a group of pixels in a subsequent image matches the object if the group of pixels has the same (or similar) shape and visual characteristics (e.g., color and intensity) irrespective of orientation or size. For example, the user may rotate the mobile device 110 or move closer to the object in an attempt to capture a better image of the object. In this example, the size and orientation of the object may change within the viewfinder, but the shape and color should remain the same or close to the same.

In another example, the on-device tracker 119 can identify edges of the object based on the pixel coordinates and track the movement of the edges from image to image. If the mobile device 110 is substantially still, the edges will likely not move much between successive images. Thus, the on-device tracker 119 can locate the edge in a subsequent image by analyzing the pixels near (e.g., within a threshold number of pixels of) the edge in the previous image.

The user interface generator 118 can generate and update user interfaces 122 that present that viewfinder of the camera 111 and other content. If the object detector 117 detects the presence of one or more objects in the viewfinder, the user interface generator 118 can present a visual indicator for each detected object in the viewfinder. The visual indicator can indicate to the user objects that have been detected and for which content it is being identified for presentation to the user.

In some implementations, the camera application 116 uses the object detector 117 to detect objects as soon as the camera application 116 is launched or the camera is activated within the camera application 116. In this way, visual indicators can be presented in real time to enable users to quickly request content related to the objects.

The user interface generator 118 can update the user interface to present the visual indicator for each object at the location of the object within the viewfinder. For example, the user interface generator 118 can present the visual indicator for the object over the object (e.g., using a translucent indicator), adjacent to the object, or within a threshold number of pixels from the object but such that the visual indicator does not block the view of other detected objects. The visual indicator for an object can include a visual highlight of the object, e.g., a visual box or other shape around the object The user interface generator 118 can present different visual indicators for different classes of objects. For example, the user interface generator 118 can store one or more visual indicators for each class of objects which the object detector 117 is configured to detect. When an object of a particular class is detected, the user interface generator 118 can select a visual indicator that corresponds to the particular class and present the visual indicator at the location of the detected object in the viewfinder. In one example, the visual indicator for text can include a circle (or other shape) with the letter 'T' or the word "text" in the circle while the visual indicator for a landmark can include a circle with the letter "L" in the circle and the visual indicator for a dog can include a circle with the letter "D" or the word "dog in the circle. The user interface generator 118 can present different visual indicators for text, barcodes, media, animals, plants and flowers, cars, faces of people, landmarks, food, apparel, electronics, bottles and cans, and/or other classes of objects that can be detected by an object detector 117. In another example, each visual indicator may include a number corresponding to the object, e.g., the visual indicator for the first object detected may include the number one, the visual indicator for the second object detected may include the number two, and so on.

In some implementations, the visual indicator for an object can be based on the actual object recognized in the viewfinder. For example, as described below, the mobile device 110 can include an object recognizer or the content distribution system 150 can perform the object detection techniques and visual indicator techniques. In these examples, the actual object may be recognized prior to presenting the visual indicator and the visual indicator can be selected based on the actual object. For example, the visual indicator for the Eiffel Tower can include a small image of the Eiffel Tower.

In some implementations, the user interface generator 118 can select the visual indicator for an object based on the class of object. The user interface generator 118 can present this visual indicator at the location of the object in the viewfinder. If the object is recognized, the user interface generator 118 can replace the visual indicator with a visual indicator selected based on the actual object recognized. For example, the object detector 117 can detect the presence of a landmark in the viewfinder and the user interface generator 118 can present a visual indicator for landmarks at the location of the detected landmark. If the landmark is determined to be the Eiffel Tower (e.g., by an object recognizer at the mobile device 110 or the content distribution system 150, the user interface generator 118 can replace the visual indicator for the landmarks with a visual indicator for the Eiffel Tower.

As described above, the on-device tracker 119 can track the location of detected objects within the viewfinder. The user interface generator 118 can use the location information for each object to move the visual indicator for each detected object such that the visual indicator for an object follows the object within the viewfinder. For example, the user interface generator 118 can continuously (or periodically) update the user interface 122 such that the visual indicator for each object follows the object and is presented at the location of the object in the viewfinder.

The visual indicators can be interactive. For example, the camera application 116 can detect interactions with (e.g., user selections of) the visual indicators. In response to detecting user interaction with a visual indicator, the camera application 116 can request, from the content distribution system 150, content related to the object for which the visual indicator is presented.

The content distribution system 150 includes one or more front-end servers 160 and one or more back-end servers 170. The front-end servers 160 can receive image data from mobile devices, e.g., the mobile device 110. The front-end servers 160 can provide the image data to the back-end servers 170. The back-end servers 170 can identify content related to objects recognized in the image data and provide the content to the front-end servers 160. In turn, the front-end servers 160 can provide the content to the mobile device from which the image data was received.

The back-end servers 170 include an object recognizer 172, a user interface control selector 174, and a content selector 176. The object recognizer 172 can process image data received from mobile devices and recognize objects, if any, in the image data. The object recognizer 172 can use computer vision and/or other object recognition techniques (e.g., edge matching, pattern recognition, greyscale matching, gradient matching, etc.) to recognize objects in image data.

In some implementations, the object recognizer 172 uses a trained machine learning model (e.g., a convolutional neural network) recognize objects in image data received from the mobile devices. For example, the machine learning model can be trained using labeled images that are labeled with their respective objects. The machine learning model can be trained to recognize and output data identifying objects depicted in images represented by the image data. The machine learning model can receive, as inputs, data related to the visual features of an image and output a data identifying objects depicted in the image.

The object recognizer 172 can also output a confidence value that indicates the confidence that the image depicts the recognized object. For example, the object recognizer 172 can determine a confidence level for each object recognized in the image based on a level of match between features of the object and the features of the image.

In some implementations, the object recognizer 172 includes multiple object recognizer modules, e.g., one for each class of objects that recognizes objects in its respective class. For example, the object recognizer 172 can include a text recognizer module that recognizes text (e.g., recognizes characters, words, etc.) in image data, a barcode recognizer module that recognizes (e.g., decodes) barcodes (including QR codes) in image data, a landmarks recognizer module that recognizes landmarks in image data, and/or other object recognizer modules that recognize a particular class of objects.

In some implementations, the camera application 116 provides, with the image data for an image, data specifying the location (e.g., pixel coordinates) within the image where a particular object or class of object was detected. This can increase the speed at which objects are recognized by enabling the object recognizer 172 to focus on the image data for that location and/or by enabling the object recognizer 172 to use the appropriate object recognizer module (e.g., only the one for the class of object specified by the data received from the camera application 116) to recognize the object(s) in the image data. This also reduces the amount of computational resources that would be used by the other object recognition modules.

The content selector 174 can select content to provide to the camera application 116 for each object recognized in the image data. The content can include information related to the object (e.g., text that includes the name of the object and/or facts about the object), visual treatments (e.g., other images or videos of the object or of related objects), links to resources related to the object (e.g., links to web pages or application pages at which the user can purchase the object or view additional information about the object), or experiences related to the object (augmented reality video, playing music in response to recognizing a singer or poster of a singer), and/or other appropriate content. For example, if the object is a barcode, the selected content may include a text-based caption that includes the name of the product that corresponds to the barcode and information about the product, a link to a web page or application page at which the user can purchase the product, and/or an image of the product.

The content selector 174 can select visual treatments that present text related to a recognized object. The visual treatments can be in the form of a text caption that can be presented at the object in the viewfinder. The text included in the captions can be based on a ranking of facts about the object, e.g., more popular facts may be ranked higher. The content selector 174 can select one or more of the captions for a recognized object to provide to the mobile device 110 based on the ranking.

The content selector 174 can select the text for a caption based on the level of confidence output by the object recognizer 172. For example, if the level of confidence is high (e.g., greater than a threshold), the text can include a popular fact about the object or the name of the object. If the level of confidence is low (e.g., less than a threshold), the text can indicate that the object might be what the object recognizer 172 detected (e.g. "this might be a golden retriever").

The content selector 174 can also select interactive controls based on the object(s) recognized in the image. For example, if the object recognizer 172 detects a phone number in the image, the content selector 174 can select a click-to-call icon that, when interacted with, causes the mobile device 110 to call the recognized phone number.

The content can be stored in a content data storage unit 178, which can include hard drives, flash memory, fast access memory, or other data storage devices. In some implementations, the content data storage unit 178 includes an index that specifies, for each object and/or type of object, content that can be provided for the object or type of object. The index can increase the speed at which content is selected for an object or type of object.

After the content is selected, the content can be provided to the mobile device 110 from which the image data was received, stored in a content cache 178 of the content distribution system 150, and/or stored at the top of a memory stack of the front-end servers 160. In this way, the content can be quickly presented to the user in response to the user requesting the content. If the content is provided to the mobile device 110, the camera application 116 can store the content in a content cache 112 or other fast access memory. For example, the camera application 116 can store the content for an object with a reference to the object so that the camera application 116 can identify the appropriate content for the object in response to determining to present the content for the object.

The camera application 116 can present content for an object in response to a user interacting with the visual indicator for the object. For example, the camera application 116 can detect user interaction with the visual indicator for an object and request the content for the object from the content distribution system 150. In response, the front-end servers 160 can obtain the content from the content cache 178 or the top of the memory stack and provide the content to the mobile device 110 from which the request was received. If the content was provided to the mobile device 110 prior to the user interaction being detected, the camera application 116 can obtain the content from the content cache 112.

In some implementations, the camera application 116 determines (e.g., automatically) to present content related to an object. For example, the camera application 116 can determine to present content for an object based on the location of the object in the viewfinder (e.g., the object closest to the center of the viewfinder) or based on detected actions of the user (e.g., zooming in on the object or moving the camera such that other objects are no longer in the field of view of the viewfinder). For example, the object detector 117 may initially detect three objects in the viewfinder and the user interface generator 118 may present a visual indicator for each of the three objects. The user may then interact with the camera application 116 to move the camera 111 (and change its field of view) or zoom in on one of the objects. The camera application 116 can determine that one or more of the objects are no longer depicted in the viewfinder or that one of the objects is now in the center of the viewfinder. In response, the camera application 116 can determine to present content for the object that remains in the viewfinder and/or that is now in the center of the viewfinder.

If the user interacts with a visual indicator to request content for an object, the user interface generator 118 can freeze the viewfinder user interface 122 (e.g., maintain presentation of the current image in the viewfinder) and present the content for the object. In this way, the user does not have to keep the mobile device 110 still with the object in the field of view to view content related to the object with the object still visible in the viewfinder.

The tasks performed by the mobile device 110 and the content distribution system 150 can be divided between the mobile device 110 and the content distribution system 150 in various ways, e.g., depending on priorities of the system or user preference. For example, the object detection (e.g., using coarse classification), visual indicator selection, object recognition, and/or content selection can be distributed between the mobile device 110, the content distribution system 150, and/or other systems.

In some implementations, the tasks can be distributed between the mobile device 110 and the content distribution system 150 based on current conditions of the environment 100. For example, if network communication is slow, e.g., due to demands placed on the network 140, the camera application 116 can perform the object recognition and content selection tasks rather than transmitting the image data over the network 140. If network communication is fast (e.g., greater than a threshold speed), the mobile device 110 can stream more images to the content distribution system 150 than when the network communication is slow, e.g., by not considering the movement of the camera 110 or whether an object is detected in the image when determining whether to send image data to the content distribution system 150.

In some implementations, the content distribution system 150 includes the object detector 117, e.g., rather than the camera application 116. In such examples, the camera application 116 can transmit image data to the content distribution system 150 continuously, e.g., in a stream of images, while the camera application 116 is active or while the user has the camera application 116 in a request content mode. The request content mode can allow the camera application 116 to send image data to the content distribution system 116 continuously in order to request content for objects recognized in the image data. The content distribution system 150 can detect objects in the image, select visual indicators for the detected objects, and send the visual indicators to the camera application 116 for presentation in the viewfinder. The content distribution system 150 can also continue processing the image data to recognize the objects, select content for each recognized object, and either cache the content or send the content to the camera application 116.

In some implementations, the camera application 116 includes an on-device object recognizer that recognizes objects in image data. In this example, the camera application 116 can recognize the objects, present visual indicators for the recognize objects, and either request content for the recognized objects from the content distribution system or identify the content from an on-device content data store. The on-device object recognizer can be a lightweight object recognizer that recognizes a more limited set of objects or that uses less computationally expensive object recognition techniques than the object recognizer 172 of the content distribution system 150. This enables mobile devices with less processing power than typical servers to perform the object recognition process. In some implementations, the camera application 116 can use the on-device recognizer to make an initial identification of an object and provide the image data to the content distribution system 150 (or another object recognition system) for confirmation. The on-device content data store may also store a more limited set of content than the content data storage unit 176 or links to resources that include the content to preserve data storage resources of the mobile device 110.

Figure 2:
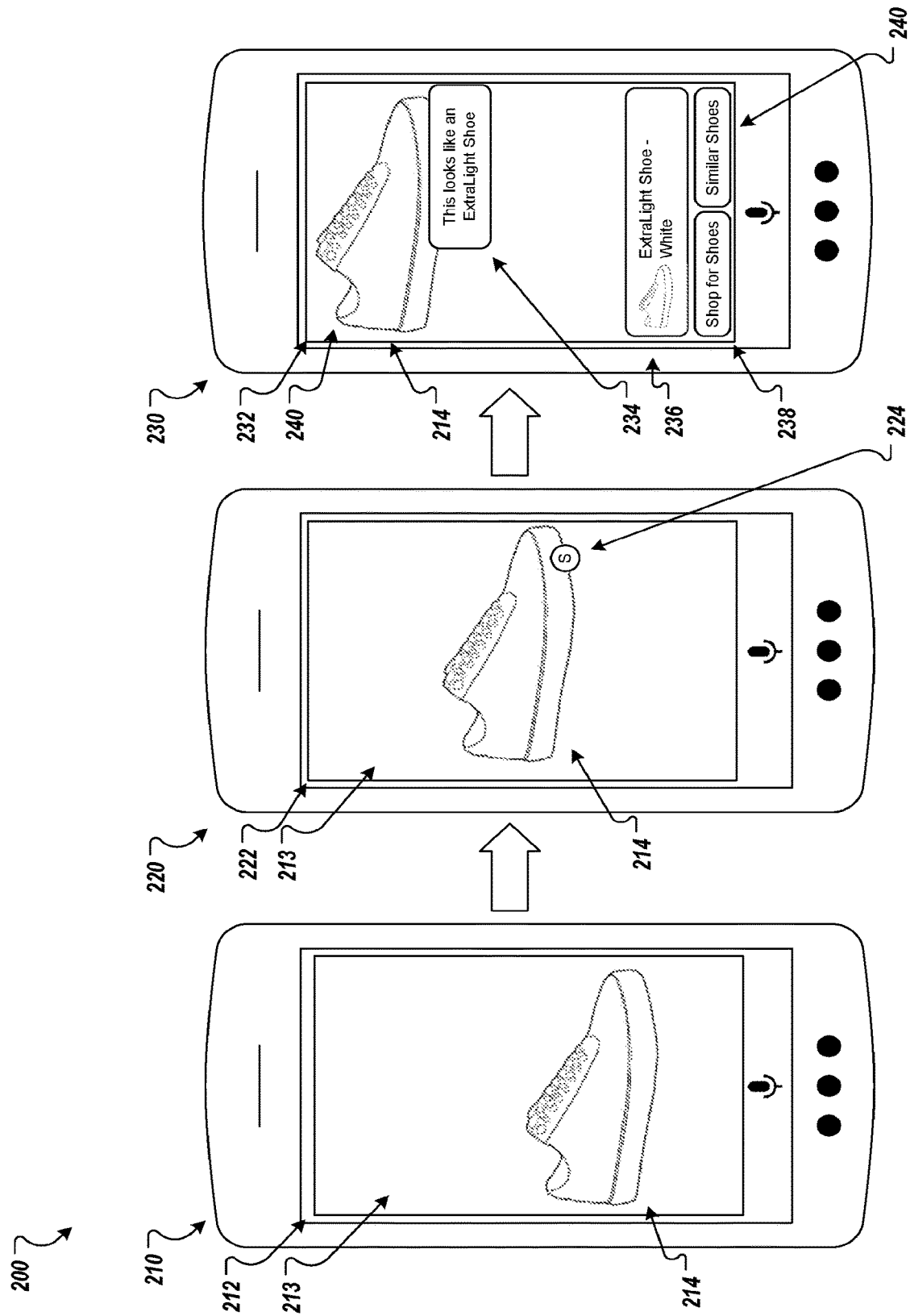
FIG. 2 depicts a sequence of example screen shots of a mobile device that presents content related to an object recognized in a viewfinder.

FIG. 2 depicts a sequence of example screen shots 210, 220, and 230 of a mobile device that presents content related to an object recognized in a viewfinder. In the first screen shot 210, the mobile device presents a user interface 212 that includes a viewfinder 213 of a camera. The viewfinder 213 depicts a shoe 214. The user interface 213 may be presented by a camera application, e.g., when the user launches the camera application.

The camera application (or a content distribution system) can process image data for the viewfinder 213 to detect the presence of any objects being depicted by the viewfinder 213. In this example, the camera application has detected the presence of the shoe 214 in the viewfinder 213. In response, the camera application can update the user interface 212 to present the user interface 222 of the screenshot 220.

The updated user interface 222 presents a visual indicator 224 for the detected shoe 214 within the viewfinder 213. In this example, the visual indicator 224 is a circle with the letter "s" in the circle. Other visual indicators with a different shape or other visual characteristics could be presented instead. The visual indicator 224 is presented at the shoe 214, e.g., over a portion of the shoe.

In updated user interface, the shoe 214 has moved upwards in the viewfinder 213, e.g., based on movement of the mobile device and/or its camera. As described above, an on-device tracker can track the location of detected objects within a viewfinder. This allows the camera application to present the visual indicator 224 for the shoe 214 at the location of the shoe 214 in the viewfinder 213.

The visual indicator 224 indicates that the shoe 224 has been detected and that content related to the shoe is being identified or has been identified. As described above, the camera application can send image data for the viewfinder to the content distribution system in response to detecting an object in the viewfinder. The visual indicator can also be interactive such that interaction with the visual indicator causes the camera application to transmit a request for content related to the shoe 214.

In response to detecting the user interaction, the camera application can update the user interface 222 to present the user interface 232 of the screenshot 230. The updated user interface 232 presents the shoe 214 and content related to the shoe 214. In some implementations, the user interface 232 presents an image 240 of the shoe 214 e.g., captured at the time the user interacted with the visual indicator 224, rather than a live image of what is in the field of view of the camera's lens. The location of the shoe 214 in the image 240 can be the same as the location of the shoe 214 in the viewfinder 213 at the time user interaction with the visual indicator 224 was detected.

The content related to the shoe 214 includes a caption 234 that specifies that the content distribution system has recognized the shoe as an "ExtraLight Shoe." The caption is presented over a portion of the shoe 214 in the image 240. The content related to the shoe also includes an interactive icon 238 that includes a link to a resource (e.g., application page or web page) at which the user can purchase ExtraLight Shoes, and an interactive icon 240 that, when interacted with, causes the camera application to present content for shoes that are similar to the ExtraLight Shoe.

Figure 3:
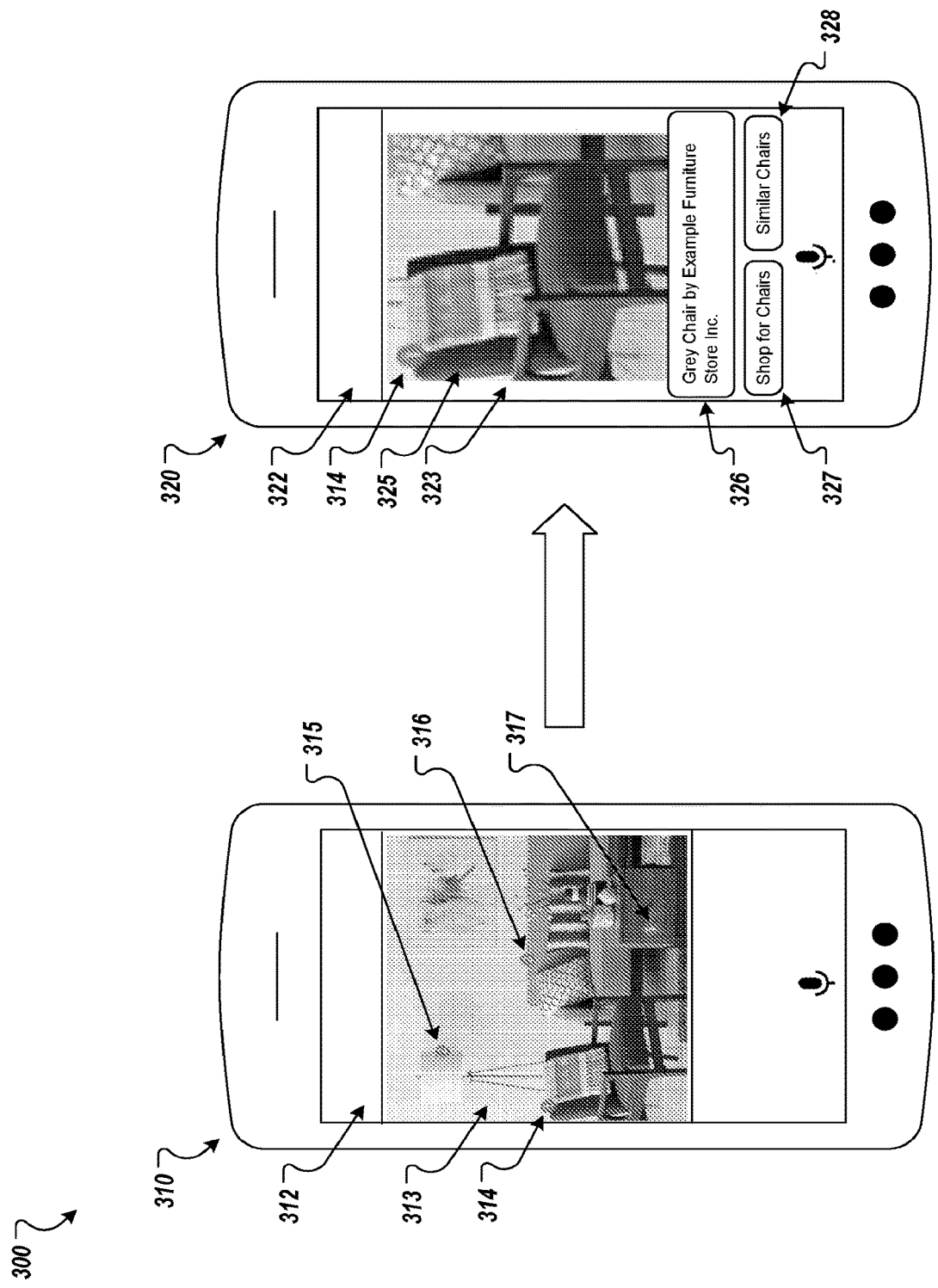
FIG. 3 depicts a sequence of example screen shots of a mobile device that presents content related to an object recognized in a viewfinder.

FIG. 3 depicts a sequence of example screen shots 310 and 320 of a mobile device that presents content related to an object recognized in a viewfinder. In the first screen shot 310, the mobile device presents a user interface 312 that includes a viewfinder 313 of a camera. The viewfinder 313 depicts furniture in a room. The user interface 313 may be presented by a camera application, e.g., when the user launches the camera application. The camera of the mobile device can be pointed at the furniture when the camera application is launched (or another time, e.g., when the mobile device becomes still).

The user interface 312 includes visual indicators 314-317 for individual pieces of furniture detected in the viewfinder 313. In this example, each visual indicator 314-317 presents a respective number that represents a corresponding piece of furniture. For example, the visual indicator 314 is a circle with the number 1 in the circle and corresponds to a grey chair in the viewfinder 313.

As the viewfinder 313 depicts a live image of what is in the field of view of the camera's lens, moving the camera or causing the camera to zoom in or out can result in different objects being presented in the viewfinder 313 and/or objects moving out of the viewfinder 313. As shown in the updated user interface 322 in the screenshot 320, the user has caused the camera to zoom in on the grey chair.

In response, the camera application can interpret the user's action as an indication that the user wants to receive content related to the grey chair. For example, the camera application can interpret the zooming in on the chair and/or the fact that the other objects are no longer depicted in the viewfinder 313 as an indication that the user is interested in receiving content related to the grey chair. In response, the camera application can present the content related to the grey chair, e.g., without detecting an interaction with the visual indicator 314 for the grey chair.

For example, the user interface 322 presents a caption 326 that includes information about the grey chair, an interactive icon 327 that includes a link to a resource (e.g., application page or web page) at which the user can shop for chairs (e.g., a web page of a retailer or that includes chairs offered by multiple retailers) and an interactive icon 328 that, when interacted with, causes the camera application to present content for chairs that are similar to the grey chair.

Figure 4:
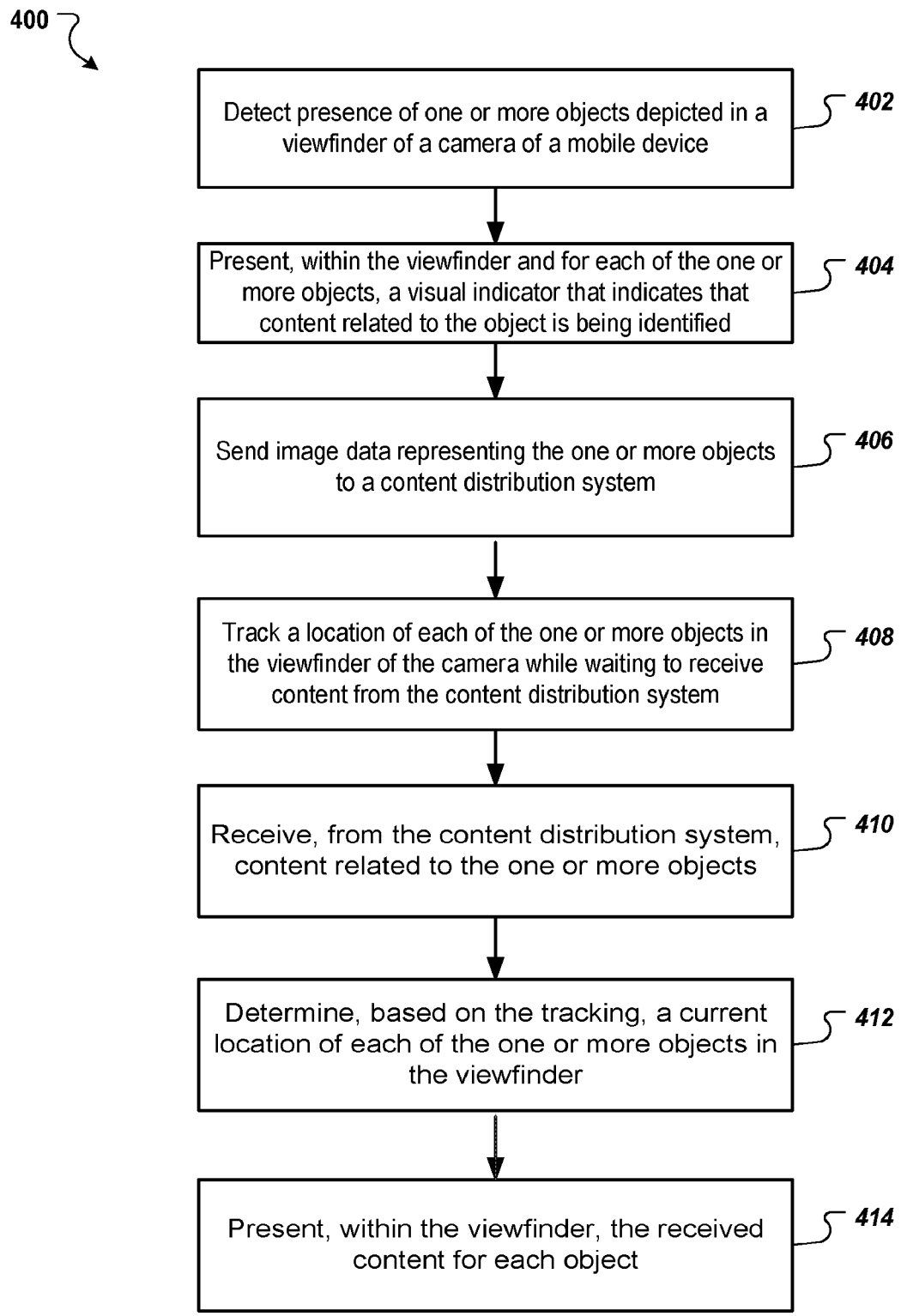
FIG. 4 is a flow chart of an example process for presenting content related to objects recognized in a viewfinder of a camera of a mobile device.

FIG. 4 is a flow chart of an example process 400 for presenting content related to objects recognized in a viewfinder of a camera of a mobile device. Operations of the process 400 can be performed, for example, by one or more data processing apparatus, such as the mobile device 110 of FIG. 1. Operations of the process 400 can also be implemented as instructions stored on a non-transitory computer readable medium. Execution of the instructions cause one or more data processing apparatus to perform operations of the process 400.

Presence of one or more object depicted in a viewfinder of a camera of a mobile device is detected (402). For example, a camera application executing on the mobile device can include an object recognizer that detects the presence of objects depicted in the viewfinder of the camera based on image data for the viewfinder.

In some implementations, the image data is captured and analyzed in response to a determination that the camera is still or has stopped moving (e.g., is not moving more than a threshold amount). If the camera is moving (e.g., more than the threshold amount), image data for the viewfinder may not be captured or processed to detect the presence of objects as the image data may not be of sufficient quality or the user may not be interested in receiving content related to anything in the field of view of the camera.

A visual indicator is presented in the viewfinder for each detected object (404). The visual indicator can indicate, to the user of the mobile device, that content is being (or has been) identified for the object. The visual indicator for an object can be presented at the location of the object in the viewfinder.

The visual indicator presented for each object can be based on a class to which the object has been classified. For example, the visual indicator for text may be different from the visual indicator for a person. The visual indicator for each object can be interactive. For example, user interaction with the visual indicator can initiate a request for content related to the object.

Image data representing the one or more objects are sent to a content distribution system (406). The content distribution system can recognize the one or more objects and select content related to each of the one or more objects. The content distribution system can send the selected content to the mobile device or store the selected content in a cache or at the top of a memory stack. If stored at the content management system, the content management system can send the content to the mobile device in response to a request for the content received from the mobile device.

A location of each of the one or more objects in the viewfinder is tracked (408). For example, as described above, the location of each object can be tracked using pixel tracking techniques. While the object is visible in the viewfinder, the current location of the object can be continuously tracked while waiting to receive content from the content distribution system or waiting for user interaction with a visual indicator for an object. In this way, the content can be presented at the location of the object without delay when the content is received or the user interacts with the visual indicator for the object.

Content is received from the content distribution system (410). The received content can be stored at the mobile device, e.g., in a local cache or other high speed memory.

The current location of each of the one or more objects is determined based on the tracking (412). For example, as described above, the location within the viewfinder of each detected object can be continuously tracked to maintain the current location of each object. When it is time to present content, the current location of each object for which content will be presented is determined based on the tracking.

The content for each object is presented in the viewfinder (414). The content for an object can be presented at the current location of the object in the viewfinder. The content can be presented when the content is received, in response to user interaction with the visual indicator for the object, or in response to determining that the object is the object in which the user is interested in receiving content.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method performed by one or more data processing apparatus of a mobile device, the method comprising:
   detecting presence of a plurality of objects depicted in a viewfinder of a camera of the mobile device;
   in response to detecting the presence of the plurality of objects:
      sending image data representing the plurality of objects to a content distribution system that selects content related to the plurality of objects depicted in the image data, and wherein the content distribution system is remotely located from the mobile device; and
      tracking the respective location of each of the plurality of objects in the viewfinder of the camera while waiting to receive the content related to the plurality of objects depicted in the image data from the content distribution system;
   receiving, from the content distribution system, the content related to the plurality of objects; and
   for each of the plurality of objects:
      determining, based on the tracking, a respective current location of the object in the viewfinder; and
      presenting, within the viewfinder and at the respective current location of the object, the received content related to the object.

2. The method of claim 1, wherein detecting the presence of the object in the image comprises:

capturing a sequence of images using the camera of the mobile device;

determining, based on pixel data for the images in the sequence of images, that the camera is substantially still;

in response to determining that the camera is substantially still, capturing a given image after the camera has stopped moving; and analyzing the given image using object detection techniques to detect the presence of the object in the given image.

3. The method of claim 2, wherein determining, based on pixel data for the images in the sequence of images, that the camera is substantially still comprises:

identifying a respective location for each pixel in a first image in the sequence of images;

for each pixel in the first image:
identifying a respective location, in one or more subsequent images captured after the first image was captured, of a corresponding pixel that matches the pixel; and
determining a distance between the respective location of the pixel in the first image and the respective location of the corresponding pixel in each subsequent image;

determining that the camera is substantially still based on each determined distance being less than a threshold distance.

4. The method of claim 1, wherein presenting, in the viewfinder for the camera, the content for the object at the respective current location of the object comprises presenting the content over or adjacent to the object in the viewfinder.

5. The method of claim 1, wherein determining a respective current location of the object in the viewfinder for the camera comprises:

identifying, in the given image, a first set of pixels that correspond to the object; and determining a location of a second set of pixels in the viewfinder that match the first set of pixels.

6. The method of claim 1, wherein the content distribution system:

analyzes the image data to recognize each of the plurality of objects;

selects content for each of the plurality of objects; and pre-caches the content prior to receiving a request for content related to the given object.

7. The method of claim 1, further comprising:

classifying each of the plurality of objects into a respective object class; and selecting, from multiple visual indicators, a respective visual indicator for each of the plurality of objects based on the respective class for the object.

8. A system comprising:

one or more data processing apparatus; and a memory storage apparatus in data communication with the data processing apparatus, the memory storage apparatus storing instructions executable by the data processing apparatus and that upon such execution cause the data processing apparatus to perform operations comprising:

detecting presence of a plurality of objects depicted in a viewfinder of a camera of a mobile device;

in response to detecting the presence of the plurality of objects:

sending image data representing the plurality of objects to a content distribution system that selects content related to the plurality of objects depicted in the image data, wherein the content distribution system is remotely located from the mobile device; and tracking the respective location of each of the plurality of objects in the viewfinder of the camera while waiting to receive the content related to the plurality of objects depicted in the image data from the content distribution system;

receiving, from the content distribution system, the content related to the plurality of objects; and for each of the plurality of objects:
determining, based on the tracking, a respective current location of the object in the viewfinder; and
presenting, within the viewfinder and at the respective current location of the object, the received content related to the object.

9. The system of claim 8, wherein detecting the presence of the object in the image comprises:

capturing a sequence of images using the camera of the mobile device;

determining, based on pixel data for the images in the sequence of images, that the camera is substantially still;

in response to determining that the camera is substantially still, capturing a given image after the camera has stopped moving; and analyzing the given image using object detection techniques to detect the presence of the object in the given image.

10. The system of claim 9, wherein determining, based on pixel data for the images in the sequence of images, that the camera is substantially still comprises:

identifying a respective location for each pixel in a first image in the sequence of images;

for each pixel in the first image:
identifying a respective location, in one or more subsequent images captured after the first image was captured, of a corresponding pixel that matches the pixel; and
determining a distance between the respective location of the pixel in the first image and the respective location of the corresponding pixel in each subsequent image;

determining that the camera is substantially still based on each determined distance being less than a threshold distance.

11. The system of claim 8, wherein presenting, in the viewfinder for the camera, the content for the object at the respective current location of the object comprises presenting the content over or adjacent to the object in the viewfinder.

12. The system of claim 8, wherein determining a respective current location of the object in the viewfinder for the camera comprises:

identifying, in the given image, a first set of pixels that correspond to the object; and determining a location of a second set of pixels in the viewfinder that match the first set of pixels.

13. The system of claim 8, wherein the content distribution system:

analyzes the image data to recognize each of the plurality of objects;

selects content for each of the plurality of objects; and pre-caches the content prior to receiving a request for content related to the given object.

14. The system of claim 8, wherein the operations comprise:
- classifying each of the plurality of objects into a respective object class; and
- selecting, from multiple visual indicators, a respective visual indicator for each of the plurality of objects based on the respective class for the object.

15. A non-transitory computer storage medium encoded with a computer program, the program comprising instructions that when executed by data processing apparatus cause the data processing apparatus to perform operations comprising:
- detecting presence of a plurality of objects depicted in a viewfinder of a camera of a mobile device;
- in response to detecting the presence of the plurality of objects:
  - sending image data representing the plurality of objects to a content distribution system that selects content related to the plurality of objects depicted in the image dataand wherein the content distribution system is remotely located from the mobile device; and
  - tracking the respective location of each of the plurality of objects in the viewfinder of the camera while waiting to receive the content related to the plurality of objects depicted in the image data from the content distribution system;
- receiving, from the content distribution system, the content related to the plurality of objects; and
- for each of the plurality of objects:
  - determining, based on the tracking, a respective current location of the object in the viewfinder; and
  - presenting, within the viewfinder and at the respective current location of the object, the received content related to the object.

16. The non-transitory computer storage medium of claim 15, wherein detecting the presence of the object in the image comprises:
- capturing a sequence of images using the camera of the mobile device;
- determining, based on pixel data for the images in the sequence of images, that the camera is substantially still;
- in response to determining that the camera is substantially still, capturing a given image after the camera has stopped moving; and
- analyzing the given image using object detection techniques to detect the presence of the object in the given image.

17. The non-transitory computer storage medium of claim 16, wherein determining, based on pixel data for the images in the sequence of images, that the camera is substantially still comprises:
- identifying a respective location for each pixel in a first image in the sequence of images;
- for each pixel in the first image:
  - identifying a respective location, in one or more subsequent images captured after the first image was captured, of a corresponding pixel that matches the pixel; and
  - determining a distance between the respective location of the pixel in the first image and the respective location of the corresponding pixel in each subsequent image;
- determining that the camera is substantially still based on each determined distance being less than a threshold distance.

18. The non-transitory computer storage medium of claim 15, wherein determining a respective current location of the object in the viewfinder for the camera comprises:
- identifying, in the given image, a first set of pixels that correspond to the object; and
- determining a location of a second set of pixels in the viewfinder that match the first set of pixels.

19. The non-transitory computer storage medium of claim 15, wherein the content distribution system:
- analyzes the image data to recognize each of the plurality of objects;
- selects content for each of the plurality of objects; and
- pre-caches the content prior to receiving a request for content related to the given object.

20. The non-transitory computer storage medium of claim 15, wherein the operations comprise:
- classifying each of the plurality of objects into a respective object class; and
- selecting, from multiple visual indicators, a respective visual indicator for each of the plurality of objects based on the respective class for the object.

* * * * *